April 25, 1961 W. E. HÄCKER 2,981,311
CONVERTIBLE SEATING INSTALLATION FOR MOTOR VEHICLES
Filed July 8, 1958 2 Sheets-Sheet 1
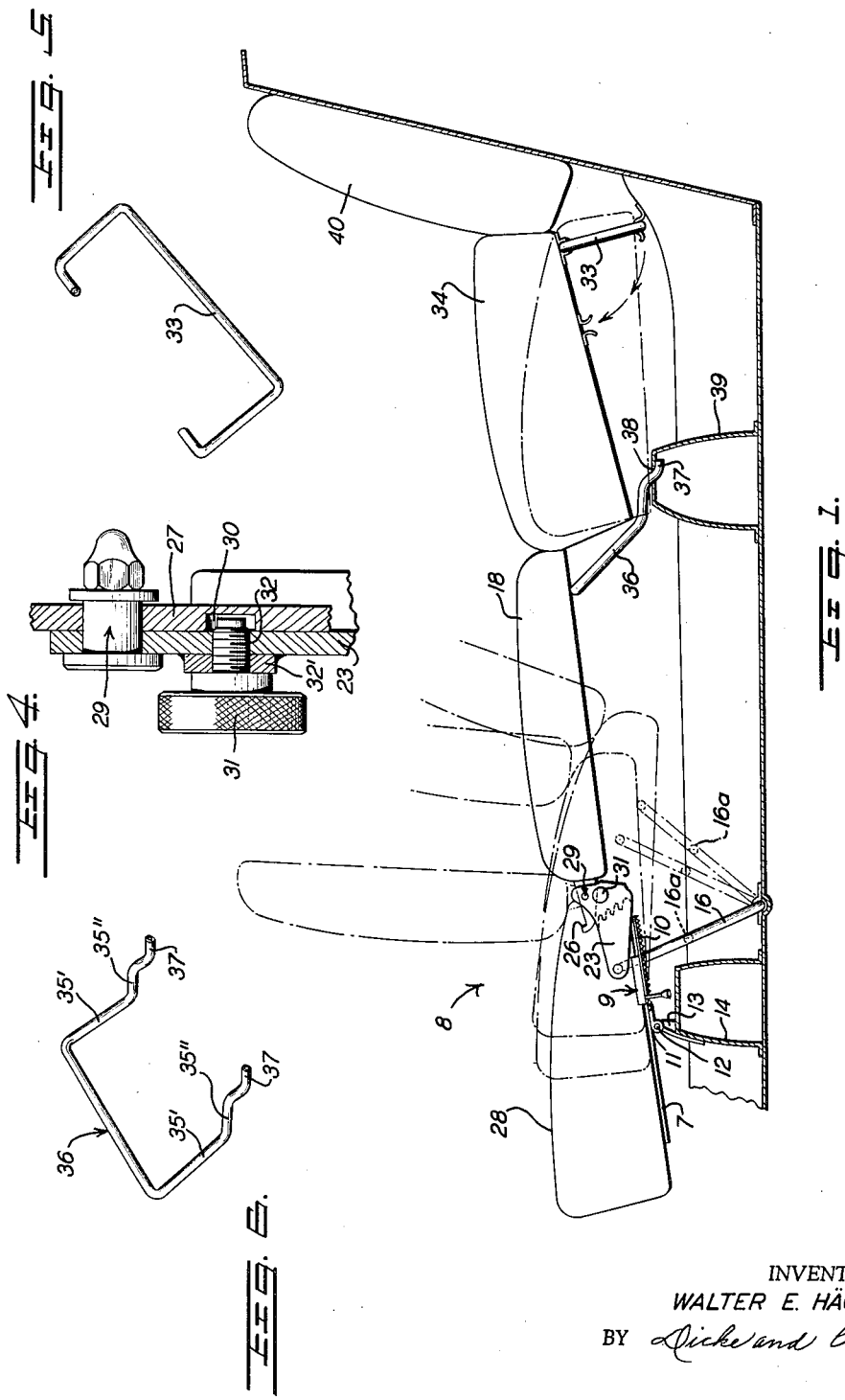
INVENTOR.
WALTER E. HÄCKER
BY Dicke and Craig
ATTORNEYS

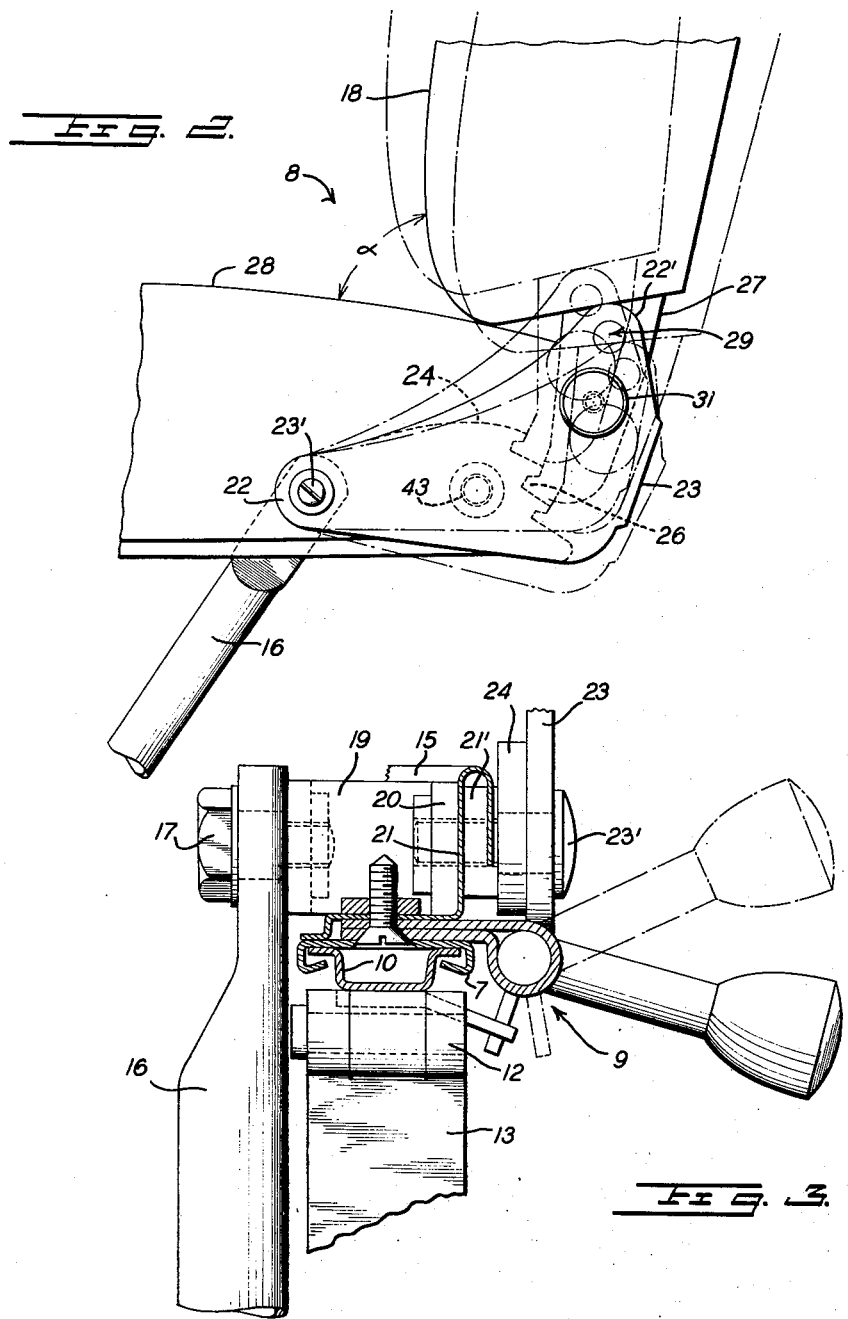

United States Patent Office 2,981,311
Patented Apr. 25, 1961

2,981,311
CONVERTIBLE SEATING INSTALLATION FOR MOTOR VEHICLES

Walter E. Häcker, Aidlingen, Kreis Boeblingen, Germany, assignor to Daimler-Benz Aktiengesellschaft, Stuttgart-Unterturkheim, Germany Filed July 8, 1958, Ser. No. 747,261

Claims priority, application Germany July 26, 1957

21 Claims. (Cl. 155—6)

The present invention relates to an arrangement for adjusting a seat which is adapted to be converted into a bed, especially to such a convertible seat as is used in passenger motor vehicles.

The present invention serves the principal purpose of enabling a change in the adjustment of the seat in the longitudinal direction as well as also in the height thereof, especially for the front seat of a motor vehicle, with simple and inexpensive means.

Furthermore, the back rest of the front seat in accordance with the present invention is so arranged and constructed as to be pivotal through several positions for purposes of adjusting a comfortable seating angle thereof and is also to be adapted to be completely laid down or folded over into an essentially horizontal position whereby in the latter case the front edge of the forward seat is inclined downwardly to such an extent, for purposes of maintaining an approximately flat berth or straight, even bed with sufficient space for the passenger's feet between the dashboard and the seat.

It is known in the prior art to construct the seat of a motor vehicle to be pivotal about an axis while the desired seating angle thereof is maintained constant as well as one which is pivotal while the seating angle thereof is changed, and to convert the same into a bed by folding over or tilting rearwardly the back rest thereof. However, the known prior art constructions cannot be uniformly used, especially not for people or persons having body dimensions which are below or above average.

With other seats of the prior art which have longitudinally movable seats and adjustable back rests, the disadvantage normally is present that the back rest during sudden stoppages of the vehicle are unintentionally folded forwardly and thereby may cause damage.

All of these inconveniences and shortcomings of the prior art are eliminated by the present invention.

The present invention consists in that the lower guide rail of the longitudinally movable seat is pivotally connected at the forward end thereof on a part or member, for example, on the front cross bearer member projecting upwardly from the vehicle floor provided in the usual manner with recesses, whereas the displaceable seat frame displaceable together with the back rest which is installed so as to be adjustably secured in the desired position thereof, is also pivotally secured with the rear part thereof at the recessed floor and includes a securing mechanism for the longitudinal displacement of the seat, which may be of any known construction, such as a conventional spring-loaded clamping-type detent mechanism cooperating with the notches of a suitably shaped rack.

Accordingly, it is an object of the present invention to provide a seating arrangement for motor vehicles which may be converted into a bed with simple and inexpensive means.

Another object of the present invention resides in the provision of a seating arrangement for motor vehicles in which the seat may be converted into a bed, taking fully into consideration the possible differences in the dimensions of different occupants or passengers of the vehicle and providing the necessary compensations therefor.

Still another object of the present invention resides in the provision of a seating arrangement for motor vehicles of the type which may be converted into a bed which prevents accidents caused by unintentional forward pivoting of the back rest of the front seat in case of sudden stoppages of the vehicle to thereby minimize the danger of damage.

These and other objects, features and advantages of the present invention will become more obvious from the following description when taken in connection with the accompanying drawing which shows, for purposes of illustration only, one embodiment in accordance with the present invention, and wherein:

Figure 1 is a somewhat schematic side view of the seating arrangement in accordance with the present invention shown in the position thereof when converted into a bed;

Figure 2 is a partial side view, on an enlarged scale, of the pivotal connection of the back rest at the seating pillow or frame thereof;

Figure 3 is a partial front view, on an enlarged scale, of the guide rail arrangement in accordance with the present invention;

Figure 4 is a cross-sectional view through the securing arrangement for the back rest;

Figure 5 is a perspective view of a support for the rear seat in accordance with the present invention; and Figure 6 is a perspective view of a U-shaped tubular bow-like member for the back rest in accordance with the present invention.

Referring now to the drawing, wherein like reference numerals are used throughout the various views to designate like parts, reference numeral 7 (Figures 1 and 3) designates the outer guide rail forming part of the seat frame 15 of the forward seat generally designated by reference numeral 8 (Figures 1 and 2) which guide rail 7 is provided with a detent mechanism generally designated by reference numeral 9 (Figures 1 and 3) of any known construction, and which is displaceably guided on the lower rail 10 (Figures 1 and 3) of inverted hat-shaped cross section (Figure 3). The guide rail 10 extends longitudinally on each side of the seat frame approximately from the center of the side thereof to the rear end thereof. Each guide rail 10 is rigidly connected at the forward end 11 thereof by means of a hinge or pivotal joint 12 with a box-shaped bracket 13 (Figures 1 and 3) provided on the forward upper edge of the forward cross bearer member 14 (Figure 1). In order to preclude or prevent the possibility of any inadvertent or undesired tilting or folding action on the part of seat 8 rendered normally feasible by this joint 12, a tubular pivotal support member 16 is connected rearwardly of the cross bearer member 14 to the frame 15 (Figure 3) of the seat 28 on the inside of the longitudinal rails 7, 10 by means of rotatable bolt members 17 (Figures 2 and 3). The frame 15 is provided with a U-shaped transversely extending reinforcing bridge member 19 for the pivotal connection of the back rest 18 (Figure 2) the flanges 20 of which (Figure 3) abut against the bent-over or folded-over frame web portion 21 on the inside thereof. Both supports 16, i.e., one on each side of the seat 8, are connected with each other by a cross strut member 16a (Figure 1) which serves as foot support or rest for the passengers seated on the rear seat 34. The use of such a construction prevents the passenger's foot from becoming wedged in when folding back the front seat. A spring (not illustrated) may be secured, on the one hand, to the cross strut member 16a which spring, on the other hand, is operatively connected with or abuts against the frame cross bearer member 14 and thereby seeks to pull the seat 8 forwardly.

One pointed corner 22 subtending the relatively small, acute angle of a right-angle, triangularly shaped guide member 23 (Figures 1, 2, 3 and 4) is secured over a toothed segment 24, disposed along the inside of guide member 23 and of a construction known per se, by means of a pivotal bolt member 23' on the outside of the seat frame 15 in extension of the axis of the rotary bolt member 17. The toothed segment 24 (Figure 2) is rigidly connected with the frame 15 by means of a two-point securing thereof including bolt member 23' and a further bolt member or screw 43 (located farther toward the rear end of the front seat 8. The nose-like ends 26 (Figure 2) of the side rails 27 projecting out of the back rest 18 and forming part of the supporting frame thereof engage into the detents 25 of the toothed segment 24. For purposes of increasing the rigidity and sturdiness in the frame web portion 21, several reinforcing and closure disks 21' (Figure 3) are inserted between the corner 22 of guide member 23 or the toothed segment 24 and reinforcing bridge member 19.

Each guide member 23 is further pivotally connected at the other end 22' thereof (Figure 2), subtending the other acute angle, with a free part of the side rail 27 of the back rest 18, such pivotal connection being generally designated by reference numeral 29 (Figures 2 and 4). A slight inclination or tilting forwardly of the back rest 18 permits the nose portions 26 of the rails 27 to disengage the notches 25 of tooth segment 24; a lifting of the back rest 18 leads from one to the next detent position thereof so that any desired inclination of the back rest 18 may be adjusted as shown in dot-and-dash lines in Figure 2.

From the other positions of the tubularly shaped support member 16 of the front seat 8 and of the seating surface 28 shown in Figure 1 in dot-and-dash lines, it may be clearly seen that the inclination of the seating surface 28 varies through a very small range. In the extreme front position, the berthed position, there is a slight forward slope, and in the extreme rear position there is a slight rearward slope. The maintenance of the seating angle α (Figure 2) may take place at any time by adjusting the back rest 18 to suit the particular desire. The movement of the seat takes place then in the manner of a single crank drive whereby the tubularly shaped support member 16 represents the crank, while the guide rail system 7, 10 constitutes the connecting link and simultaneously also the swinging arrangement. In order to be able to maintain the inclined adjustment of the back rest 18 with each movement of the seat 28 and also during sudden impact, each or both projecting rail parts 27 of the back rest 8 are provided below the upper guide support or bearing 29 with a dead end bore 30 (Figure 4) into which the forward end of a knurled bolt member 31 engages. The knurled bolt member 31 is threaded into a threaded bore 32 of the guide member 23. The guide member 23 is reinforced at this place by a reinforcing disk 32' emplaced from the outside thereof. For purposes of compensating for small displacements which may occur during the adjustment of the back rest 18, the dead end bore 30 has a larger diameter with respect to the bolt portion of the knurled member 31.

For purposes of converting the seat into a bed as shown in Figure 1, a tubularly shaped support member 33 (Figures 1 and 5) provided underneath rear seat 34 is turned downwardly into the approximately vertical position thereof as shown in full lines in Figure 1. The support member 33 is normally accommodated essentially horizontally below the rear seat frame where it can be secured with the longer transversely extending, nonangularly bent part thereof by clamping action when normally turned upwardly, forwardly approximately into the center of the seat about the pivotal connection thereof at the lower rear end of rear seat 34. The rear seat 34 is placed with the forward lower end thereof on an approximately horizontal angularly bent, bow-shaped support element generally designated by reference numeral 36 (Figure 6) of a U-shaped tubular construction which is inserted with the off-set portions 37 of the leg portions 35' thereof into appropriate apertures or suitable openings 38 in the rear cross bearer 39. After folding the back rest 18 of the front seat 8 until abutment thereof against the inserted bow-shaped member 36, and after raising the rear seat 34 onto the lower support member 33 thereof as well as onto the angularly bent portion 35" of the leg portions 35' of bow-shaped member 36, a bed is produced which is sufficient in length and height, and the end portion of which is formed by the back rest 40 of the rear seat 34.

The configuration of the support member 36 is susceptible of modification without departing from the scope of the invention. For example, two unconnected support pieces similar to the bent leg portions 35' might be utilized instead of the bow-shaped member shown in Figure 6.

With the use of the construction according to the present invention, a seating adjustment is assured which fulfills all needs and requirements while simultaneously therewith a comfortable bed may also be established in a motor vehicle without great difficulties which is comfortable for the occupant.

While I have shown and described one embodiment in accordance with the present invention, it is understood that the same is not limited thereto but is susceptible of many changes and modifications within the spirit and scope of the present invention, and I, therefore, intend to cover all such changes and modifications as are encompassed by the appended claims.

I claim:

1. An installation for adjusting a seat adapted to be converted into a bed comprising seat frame means adapted to be moved in the longitudinal direction including lateral guide rail means on each side of said frame means, an adjustable back rest for said seat, first means pivotally connecting said back rest to said seat frame means, a relatively stationary vehicle part disposed below said seat, second means pivotally connecting the forward end of said guide rail means with said relatively stationary part, means for pivotally connecting the rear part of said displaceable seat frame means together with said adjustable back rest with said relatively stationary part, and means for adjustably securing said seat frame means in a plurality of longitudinally spaced positions.

2. An installation for a seat adapted to be converted into a bed according to claim 1, wherein said relatively stationary part is a frame cross member.

3. An installation for a seat adapted to be converted into a bed according to claim 1, wherein said relatively stationary part includes a vehicle floor provided with recesses.

4. An installation for a seat adapted to be converted into a bed according to claim 1, further comprising support means detachably secured to said relatively stationary part for supporting thereon said back rest when tilted over into the position thereof for the bed.

5. An installation for a seat adapted to be converted into a bed according to claim 1, wherein said frame means includes a toothed member rigidly secured thereto and, wherein said first means includes a guide member pivotally connected, on the one hand, with said frame means and, on the other hand, with said back rest, and engaging means on said back rest adapted to engage said toothed member.

6. An installation for adjusting a seat adapted to be converted into a bed, especially for motor vehicles, comprising seat frame means adapted to be moved in the longitudinal direction, lateral guide rail means each having two cooperating rail members on each side of said frame means for supporting the same, a back rest for said seat, first means pivotally connecting said back rest to one of said rail members of said lateral guide rail means, a relatively stationary vehicle part disposed below said seat, second means pivotally connecting the forward end of the other one of said rail members to said relatively stationary part, third means pivotally securing said displaceable seat frame means together with said adjustable back rest to said relatively stationary part, and means operatively connected with said guide rail means for adjusting the position of said seat frame means in the longitudinal direction thereof.

7. An installation for a seat adapted to be converted into a bed according to claim 6, wherein said third pivotal means includes a support member on each side of said seat, each support member being pivotally secured to said relatively stationary part and to said seat frame means, and cross strut means intermediate said two pivotal connections for connecting said two support members with each other.

8. An installation for a seat adapted to be converted into a bed according to claim 7, further comprising spring means operatively connected between said support members and said relatively stationary part to normally urge said seat forwardly.

9. An installation for a seat adapted to be converted into a bed according to claim 8, wherein said spring means is a coil spring, wherein said relatively stationary part includes a cross bearer member, and wherein said coil spring is operatively connected between said cross bearer member and said cross strut means, said cross strut means being disposed at about one half the height of said support members.

10. An installation for a seat adapted to be converted into a bed according to claim 9, wherein said cross bearer member includes bracket means, and wherein said second pivotally connecting means is constructed as a hinge joint secured to said bracket means.

11. An installation for adjusting a seat adapted to be converted into a bed, especially for motor vehicles, comprising seat frame means adapted to be moved in the longitudinal direction including lateral guide rail means on each side of said frame means, an adjustable back rest for said seat, first means pivotally connecting said back rest to said seat frame means, a relatively stationary vehicle part disposed below said seat, second means pivotally connecting the forward end of said guide rail means at said relatively stationary part, third means pivotally securing said seat frame means together with said adjustable back rest to said relatively stationary part, and means for adjusting said seat frame in the longitudinal direction thereof.

12. An installation for a seat adapted to be converted into a bed according to claim 11, wherein said relatively stationary part includes a vehicle floor and at least one cross bearer member, and wherein said second means includes a hinge-like joint secured, on the one hand, to said cross bearer member and, on the other, to said rail means.

13. An installation for adjusting a seat adapted to be converted into a bed, especially for motor vehicles, comprising seat frame means adapted to be moved in the longitudinal direction thereof, lateral guide rail means each having two cooperating guide rail members on each side of said frame means for supporting the same, toothed means rigidly connected with said seat frame means, an essentially triangularly shaped guide member, a back rest for said seat, first means pivotally connecting said back rest to said triangularly shaped guide member, a relatively stationary vehicle part disposed below said seat, second means pivotally connecting the forward end of one of said guide rail members to said relatively stationary part, third means pivotally connecting said triangularly shaped guide member to said seat frame means and means for pivotally securing the latter in the rear part thereof on said relatively stationary part, and means for adjusting the position of said seat frame in the longitudinal direction thereof.

14. An installation for a seat adapted to be converted into a bed according to claim 13, wherein said back rest includes side rails each having a free end and projecting beyond the contours of said back rest, and wherein said free ends rest on said toothed means when said back rest is tilted into the bed-like position thereof, said installation further comprising support means for supporting the rear end of said back rest on said relatively stationary part when it is adjusted to form part of the bed.

15. An installation for a seat adapted to be converted into a bed according to claim 14, wherein the vehicle includes a rear seat adapted to be raised, wherein said further support means is a U-shaped bow-like support member detachably secured to a rear cross bearer member, and wherein said rear seat includes pivotal support means to raise the same, said rear seat being also supported on said U-shaped support member when raised into the bed-like position thereof by said pivotal support means thereof.

16. An installation for a seat adapted to be converted into a bed according to claim 15, wherein said U-shaped support member includes two leg portions each having an off-set portion near the free end thereof.

17. An installation for a seat adapted to be converted into a bed according to claim 13, wherein said third means simultaneously serves to connect said toothed means to said seat frame means and to enable pivotal movement of said triangularly-shaped guide member.

18. An installation for a seat adapted to be converted into a bed according to claim 13, wherein said back rest includes a side rail member on each side thereof projecting out from said back rest and having a nose-like portion, and wherein said first means pivotally connects the upper corner of each of said triangularly-shaped guide members to a respective nose-like portion adapted to engage a corresponding toothed means.

19. An installation for a seat adapted to be converted into a bed according to claim 13, wherein said back rest includes projecting side rails, wherein said first means includes a pivotal connection between a respective triangularly shaped guide member and side rail, and means operatively connected between a respective triangularly shaped guide member and side rail to prevent unintentional tilting of said back rest during sudden impacts.

20. An installation for a seat adapted to be converted into a bed according to claim 19, wherein said last-mentioned means includes a dead-end bore in each side rail, and a threaded bolt member threadably secured in a respective triangularly shaped guide member and extending with the free end thereof into a corresponding dead-end bore.

21. An installation for a seat adapted to be converted into a bed according to claim 1, further comprising means to essentially preclude unintentional pivotal movement between said back rest and said seat frame means.

References Cited in the file of this patent
UNITED STATES PATENTS

| | | |
|---|---|---|
| 1,640,968 | Southern | Aug. 30, 1927 |
| 2,815,794 | Hendrickson | Dec. 10, 1957 |

FOREIGN PATENTS

| | | |
|---|---|---|
| 696,380 | France | Oct. 14, 1930 |
| 444,483 | Great Britain | Mar. 17, 1936 |